United States Patent Office 3,578,494
Patented May 11, 1971

3,578,494
ZINC PLATING BY CHEMICAL REDUCTION
Billy J. Williams and Charles M. Starks, Ponca City, Okla., assignors to Continental Oil Company, Ponca City, Okla.
No Drawing. Filed Apr. 9, 1969, Ser. No. 814,797
Int. Cl. C23c 17/02
U.S. Cl. 117—160                                7 Claims

ABSTRACT OF THE DISCLOSURE

Thin films of zinc can be plated onto substrates at ambient temperatures by first coating the substrate with an organo zinc compound and then contacting the wetted substrate with an aluminum compound having at least one hydrogen bonded directly to the aluminum. The aluminum hydride serves to reduce the zinc compound, and good adhesive thin films of zinc on the substrate are formed.

BACKGROUND OF THE INVENTION

Zinc coating on carbon steel has been used for many years to protect the steel against oxidation or rust. Metallic coatings on natural and synthetic films such as paper, cellophane and films of various polymers can give them pleasing appearance and also impart electrical conductivity to the material. Zinc is relatively inexpensive as a coating material and has for many years been employed for these uses.

The prior art has utilized hot dip techniques which obviously cannot be used with many materials such as paper, films, leather and the like and also has the disadvantage, where applicable, of depositing relatively thick films, and frequently failures in the coating are experienced due to lack of adhesion to the surface. Electrodeposition is expensive and also requires that the surface which is to be coated also be conductive. Thermal decomposition has partially solved the problem, since the organo zinc compounds are relatively sensitive to heat, but even some substrates are adversely affected by such mild heat exposure when wet with the zinc compound. Also, due to the relative sensitivity of the compound to heat, it is difficult to decompose only thin film, and also some organo zinc is decomposed in solution causing occlusion in the plating.

OBJECTS OF THE INVENTION

It is an object of this invention to provide a relatively simple and inexpensive method of applying a thin, adhering zinc coating to a substrate. Other objects and advantages of the invention will be obvious to those skilled in the art from the following description and examples.

SUMMARY OF THE INVENTION

A substrate to be zinc coated is wetted with an organo zinc compound and is thereafter contacted with an aluminum hydride to reduce the zinc compound causing zinc to be plated upon the substrate.

DETAILED DESCRIPTION OF THE INVENTION

A decomposable organo zinc compound, preferably in a solution, is coated onto the substrate to be plated by any suitable means, such as dipping or spraying. Excess solution is removed generally by draining the liquid off the substrate, and the wetted substrate is then contacted, again by any suitable means, such as spraying or dipping with an aluminum hydride, preferably also in solution. The temperature and pressure are not critical; therefore, ambient conditions will generally be used.

The concentration of the zinc compound in solution can vary anywhere from one percent to the pure compound and will depend, primarily, upon the thickness of the plate desired. Ordinarily, one would use 5 to 50 percent zinc compound in a hydrocarbon solvent. Although the solvent is not critical, except that it should have no functional groups which would react with the aluminum hydride, that is, it is not itself reducible. Alcohols and/or moisture should, therefore, be avoided, and hydrocarbons are preferred since they are available at reasonable cost and are nonreactive with the aluminum compound.

Similarly, the aluminum hydride concentration can vary in a wide range, for example 1 to 100 percent. It is only necessary that sufficient hydride be present to reduce the zinc compound. Preferably, the aluminum compound will be in a 20 to 70 percent solution in a hydrocarbon solvent. Again, the solvent need not be hydrocarbon so long as it does not react with the aluminum compound and is compatible with the solvent for the zinc compound. From a practical consideration, one would prefer to use the same solvent for both the zinc and the aluminum compound in order that the recovery of the solvent is simplified. It is well known that the aluminum hydrides are very reactive with moisture and therefore it is preferred that they be in a solution in a hydrocarbon which protects them from the atmosphere.

Since the solvent serves only as a diluent, the only requirement is that the reactants be soluble therein and that it be liquid. Preferably, it should not be viscous since the most efficient means of removing solution from the substrate is by draining. The solvents can be aliphatic, either normal or branched, cyclic or aromatic. Those skilled in the art will know that the paraffins of 5 to 12 carbon atoms will generally be used as these are relatively inexpensive and are readily obtainable. Paraffins of less than 5 carbon atoms will generally have too high a vapor pressure to consider, whereas those of greater than about 12 carbon atoms are not readily available. Those paraffins of 30 or more carbon atoms are usually viscous or even solid at ambient temperatures and ordinarly would not be employed. In addition to paraffins, of the aromatics, benzene will sometimes be employed depending upon the demand for benzene for other purposes at the time. The cycloparaffins also are operable but generally are too valuable for use as a solvent. The preferred solvents then include pentane, hexane, nonane, decane, dodecane, and the like and branched paraffins such as 2-methylbutane, 3-ethylheptane, 2-methyl, 4-ethyldecane, and the like. Larger branches can be present, but again economics and availability rule them out. Also mixtures of the solvents can be used, thus kerosenes and so-called wash oils may be employed as well as the heavier naphthas; however, for convenience of recovery of the solvents, we prefer a relatively pure single paraffin such as n-hexane or n-decane.

The organo zinc compound can also vary widely in substituents on the zinc. For example the zinc can have two alkyl substituents of one to 20 carbon atoms or more, preferably the total carbon atoms in the two alkyl substituents will not exceed about 22. The substituents can be aryl or cyclic and mixed substituents such as one alkyl and one aryl or two alkyls of different chain lengths. The substituents can be branched, e.g., branched alkyls or one branched and one normal. The aryl substituent can be further substituted say with alkyls. The substituents will generally be saturated. Olefinic unsaturated compounds will displace the hydride of the aluminum; and, therefore, such compounds are to be avoided. For convenience, we shall refer to the substituents as being saturated, and such term is intended to include aromatics. Also operable are zinc oxyhydrocarbons, particularly alkoxides. Again, for ease of preparation and availability, we would use a symmetrical dialkyl zinc wherein the alkyl substituents contain 2 to 3 carbon atoms. That is, the preferred organo zinc compounds are diethyl zinc, dipropyl zinc and diisopropyl zinc.

The zinc compound will generally be used in a concentration in the solvent as it is prepared or received.

Similarly, the aluminum hydride can be used in many forms. The only requirement is that it have at least one hydrogen to aluminum bond. The other substituents on the aluminum can be as varied as that indicated for the zinc comprising, e.g., normal and branched alkyls, aromatic or cyclic. The substituents can be the same or different, or one may employ the aluminum trihydride or an aluminum dihydride hydrocarbon. In any of the above the hydrocarbon oxide can be employed, and particularly the alkoxides. Normally, we would use a mono- or dihydride aluminum alkyl wherein the alkyls in the case of the monohydride are the same and in both cases the alkyl substituent will contain 2 or 3 carbon atoms. Thus, the preferred compounds include aluminum trihydride, aluminum diethyl hydride, aluminum isopropyl dihydride, ethyl aluminum dihydride, aluminum dipropylhydride, and the like.

The plating temperatures and pressures will normally be ambient. These are not critical except that one would avoid temperatures approaching the decomposition temperature of the organo-metal compound. Obviously, one would not work at temperatures below the freezing point of any of the compounds. With the heavier metal compounds and solvent, atmospheric pressure or only slight pressure will be employed. With lighter compounds, e.g., those with high vapor pressures, then sufficient pressure will be employed to keep the reactants and solvent in the liquid state. Higher pressures are operable but certainly not necessary; therefore, they are not used in the preferred embodiment.

Typical platings then include spraying a sheet of carbon steel with a 15 percent solution of methylethyl zinc in benzene, allowing the excess solution to drain into a collection vessel for reuse and thereafter spraying the wetted sheet with a 30 percent solution of aluminum trihydride in heptane. A nice uniform coating of zinc is plated upon the sheet of carbon steel.

A fired ash tray of pottery clay is dipped into a 5 percent solution of diisopropyl zinc in hexane, removed, and the excess solution drained off. The wetted ash tray is then dipped into a 1 percent solution of dipropoxy-aluminum hydride and after about 3 minutes removed and dried. The tray is coated with a uniform adhering coating of zinc.

A sheet of regenerated cellulose is sequentially passed through a 50 percent solution of zinc dihexyl in n-decane, a zone wherein excess solution is drained off, a 70 percent solution of octylaluminum dihydride in decane, a zone for allowing excess aluminum solution to drain, and a drying zone. The regenerated cellulose sheet is covered with a zinc coating. Other platings will be obvious to those skilled in the art, and it is believed unnecessary to cite other examples since it should be obvious from the above disclosures that one skilled in the art will see many applications and combinations.

Two bench scale runs were made to illustrate the effectiveness of our method.

A solution of 22 percent diethyl zinc was prepared in n-decane. Several pieces of porous ceramic material were placed in this solution. Each piece was removed from the solution and allowed to drain of excess organo zinc solution. These wetted ceramic pieces were then placed in 50 percent solution of diethylaluminum hydride in a mixed paraffin hydrocarbon as received from the plant. The mixed paraffin hydrocarbon is a raffinate having a boiling range from about 100° C. to about 200° C. Metal plating of the ceramic substrate occurred immediately, resulting in a uniform, thin adhering coating. Analysis of the metal showed that it was zinc.

The above run was repeated using an electric carbon brush as the substrate. The results were substantially the same as in the first run.

Those skilled in the art will see many modifications which can be made to obtain a zinc coating on various substrates.

Having thus described the invention, we claim:

1. A method of depositing a zinc coating on a substrate which comprises contacting the substrate first with an organo zinc compound having saturated substituents and subsequently contacting the substrate wetted with the organo zinc compound with an aluminum hydride.

2. The method of claim 1 wherein the organo zinc compound and the aluminum hydride are each in solution in a saturated hydrocarbon wherein the hydrocarbon solvent is present in the range 1 to 99 weight percent.

3. The method of claim 2 wherein the organo zinc compound is present in solution in the range 5 to 50 weight percent and the aluminum hydride is present in solution in the range 20 to 70 percent.

4. The method of claim 3 wherein the hydrocarbon is aliphatic.

5. The method of claim 4 wherein the zinc is a dialkyl zinc and the aluminum hydride contains at least one alkyl substituent.

6. The method of claim 5 wherein the alkyl substituent contains 2 to 3 carbon atoms.

7. The method of claim 6 wherein the zinc compound is diethyl zinc and the aluminum hydride is diethyl aluminum hydride.

References Cited

UNITED STATES PATENTS

| | | | |
|---|---|---|---|
| 3,244,554 | 4/1966 | Prestridge et al. | 117—130X |
| 3,434,879 | 3/1969 | Langley | 117—160X |
| 3,449,144 | 6/1969 | Williams et al. | 117—160X |
| 3,462,288 | 8/1969 | Schmidt et al. | 117—160X |
| 3,501,333 | 3/1970 | Groves et al. | 117—160X |

ALFRED L. LEAVITT, Primary Examiner

J. R. BATTEN, JR., Assistant Examiner

U.S. Cl. X.R.

117—123, 130, 144